(12) United States Patent
Moheb et al.

(10) Patent No.: US 11,289,819 B2
(45) Date of Patent: Mar. 29, 2022

(54) MULTISAT SHAPED REFLECTOR ANTENNA

(71) Applicants: Hamid Moheb, Clemmons, NC (US); Mohammad Maula, Morrisville, NC (US); Edmund F. Petruzzelli, Centennial, CO (US)

(72) Inventors: Hamid Moheb, Clemmons, NC (US); Mohammad Maula, Morrisville, NC (US); Edmund F. Petruzzelli, Centennial, CO (US)

(73) Assignee: RAVEN ANTENNA SYSTEMS INC., Smithfield, NC (US)

( * ) Notice: Subject to any disclaimer, the term of this patent is extended or adjusted under 35 U.S.C. 154(b) by 163 days.

(21) Appl. No.: 16/233,737

(22) Filed: Dec. 27, 2018

(65) Prior Publication Data

US 2019/0207320 A1     Jul. 4, 2019

Related U.S. Application Data

(60) Provisional application No. 62/611,224, filed on Dec. 28, 2017.

(51) Int. Cl.
| | |
|---|---|
| *H01Q 19/13* | (2006.01) |
| *H01Q 15/16* | (2006.01) |
| *H01Q 19/17* | (2006.01) |
| *H01Q 19/10* | (2006.01) |

(52) U.S. Cl.
CPC ........... *H01Q 19/132* (2013.01); *H01Q 15/16* (2013.01); *H01Q 19/102* (2013.01); *H01Q 19/17* (2013.01)

(58) Field of Classification Search
CPC ...... H01Q 19/10; H01Q 19/102; H01Q 19/12; H01Q 19/13; H01Q 19/132; H01Q 19/17; H01Q 15/147; H01Q 15/16; H01Q 15/165; H01Q 15/166; H01Q 15/167; H01Q 15/14; H01Q 15/141; H01Q 15/148; H01Q 15/161; H01Q 15/162; H01Q 15/163; H01Q 15/168
See application file for complete search history.

(56) References Cited

U.S. PATENT DOCUMENTS

| | | | |
|---|---|---|---|
| 6,211,842 B1 * | 4/2001 | Cousin ..................... | H01Q 3/16 343/755 |
| 6,255,997 B1 * | 7/2001 | Ratkorn ............... | H01Q 15/147 343/781 R |
| 6,366,257 B1 * | 4/2002 | Ramanujam .......... | H01Q 1/288 343/755 |

* cited by examiner

*Primary Examiner* — Robert Karacsony
(74) *Attorney, Agent, or Firm* — Murphy, Bilak & Homiller, PLLC

(57) ABSTRACT

According to an aspect, a satellite antenna reflector includes a first surface area encompassing a first surface, where the first surface is formed to reflect a first radiated signal towards a first focal point. The reflector also includes a second surface area, encompassing a second surface, where the second surface area is formed to reflect a second radiated signal towards a second focal point. The first and second surfaces reflect the first and second radiated signals such that a first antenna gain and/or beamwidth of the reflected first radiated signal that would be received at the first focal point is the same as a second antenna gain and/or beamwidth of the reflected second radiated signal that would be received at the second focal point.

15 Claims, 5 Drawing Sheets

Cross-section slice of reflector at border of first and second surfaces

MULTISAT SHAPED REFLECTOR ANTENNA

CROSS-REFERENCE TO RELATED APPLICATIONS

This application claims priority to U.S. Provisional Application No. 62/611,224, filed Dec. 28, 2017, the contents of which are incorporated by reference in their entirety.

TECHNICAL FIELD

The present invention relates to reflectors for satellite antennas.

BACKGROUND

Satellite antennas are used to bring Direct-To-Home (DTH) TV programming to the consumer market from satellite broadcasts. There are multiple companies that provide DTH TV programming, with each company providing TV channels through its own satellite broadcast.

Some areas of the U.S. market, such as Puerto Rico or Alaska, are considered "fringe" areas, because DTH TV satellites do not cover these areas as well. Therefore, in these fringe areas, larger size antennas are required where satellites are spaced 22° apart along a geostationary arc. For example, these areas might require a 1.2 meter satellite antenna rather than the more common 18" satellite antenna.

This increased antenna size becomes more of an issue when satellites are far apart in space and local communities are expected or required to provide the channels of multiple satellites. This could mean that at least three 1.2 meter satellite antennas are to be installed at a residence, leading to increased installation costs and unfavorable aesthetics. Some approaches involve several low-noise block feedhorns (LNBFs) using the same antenna, but these approaches suffer from scan loss associated with the LNBFs' displacement from the reflector's main focal point. Furthermore, the DTH commercial market is price sensitive and satellite service providers are competing with cable and other wireless technologies.

SUMMARY

Embodiments of the present invention describe a satellite reflector antenna that enables a single satellite antenna installation to take the place of multiple satellite antenna installations.

A standard parabolic reflector antenna suffers from scan losses if its feed horn is moved away from its only focal point, resulting in antenna gain drop, widening of the beamwidth and an increase in antenna noise temperature. This directly impacts the signal quality.

According to some embodiments, a reflector antenna is shaped to reflect radiated signals off a first side of the reflector antenna. The reflector antenna is further shaped to improve the scan losses due to the LNBF being placed away from the reflector antenna's main focal point. The reflector antenna includes a first surface area of the first side encompassing a first surface, where the first surface is formed to reflect a first radiated signal towards a first focal point. The reflector includes a second surface area of the first side encompassing a second surface. The second surface area may be inclusive of the first surface area. The second surface area can be considered a virtual surface area, because the second surface is still part of the first side of the reflector antenna, but the geometry (shape of the reflector antenna) over the area of the second surface is different than the geometry for the area of what is considered to be just the first surface. The second surface area is formed to reflect a second radiated signal towards a second focal point that is different than the first focal point.

The first and second surface areas and the respective first and second surfaces may be formed to reflect the first and second radiated signals such that a first antenna gain and/or beamwidth of the reflected first radiated signal that would be received at the first focal point is about the same as a second antenna gain and/or beamwidth of the reflected second radiated signal that would be received at the second focal point. For example, at least a portion of the second surface is raised or recessed with respect to the first surface, and the second surface area may be a different area shape than the first surface area.

In this case, the reflector antenna may also include a third (virtual) surface area of the first side encompassing a third surface, where the reflector antenna surface is formed to reflect a third radiated signal towards a third focal point that is different than the first and second focal points. The third surface area may be inclusive of the first and second surface areas. The first, second and third surface areas and the respective first, second and third surfaces are formed to reflect the first, second and third radiated signals such that a first antenna gain and/or beamwidth of the reflected first radiated signal that would be received at the first focal point is about the same as a second antenna gain or beamwidth of the reflected second radiated signal that would be received at the second focal point and a third antenna gain and/or beamwidth of the reflected third radiated signal that would be received at the third focal point.

According to some embodiments, an antenna system includes an antenna mount, a first LNBF, a second LNBF, a feed bracket configured to attach the first LNBF and the second LNBF, a boom arm extending from the antenna mount to the feed bracket, and a reflector antenna coupled to the antenna mount, where the surface of the reflector antenna is shaped to reflect radiated signals off a first side of the reflector. The reflector antenna includes a first surface area of the first side encompassing a first surface, where the first surface is formed to reflect a first radiated signal towards the first LNBF. The reflector antenna includes a second surface area of the first side, inclusive of the first surface area and encompassing a second surface. The second surface is formed to reflect a second radiated signal towards the second LNBF. The first and second surface areas and the respective first and second surfaces are formed to reflect the first and second radiated signals such that a first antenna gain and/or beamwidth of the reflected first radiated signal received at the first LNBF is about the same as a second antenna gain and/or beamwidth of the reflected second radiated signal received at the second LNBF.

The antenna system may include a third LNBF, where the feed bracket is configured to attach the first, second and third LNBFs in an array. The reflector antenna may then include a third surface area of the first side, inclusive of the first and second surface areas, encompassing a third surface. The third surface is formed to reflect a third radiated signal towards the third LNBF, where the first, second and third surface areas and the respective first, second and third surfaces are formed to reflect the first, second and third radiated signals such that a third antenna gain and/or beamwidth of the reflected third radiated signal received at the third LNBF is about the same as the second antenna gain or beamwidth and the third antenna gain and/or beamwidth.

The reflector antenna described in the embodiments may provide equal antenna beamwidth and gain for each satellite location with similar electrical performance over a wide geostationary arc span 22° apart. The shaped reflector surface and profile can be used to overcome scan losses related to an LNBF being placed away from an antenna focal point. The reflector antenna can provide multiple focal points for the same antenna, eliminating antenna scan loss and beam broadening.

Of course, the present invention is not limited to the above features and advantages. Those of ordinary skill in the art will recognize additional features and advantages upon reading the following detailed description, and upon viewing the accompanying drawings.

DETAILED DESCRIPTION

Embodiments of the present invention describe a satellite reflector antenna that enables a single satellite antenna installation to take the place of multiple satellite antenna installations. This is made possible by a reflector antenna that is specially shaped to reflect signals to multiple focal points, where multiple receivers (e.g., LNBFs) may be fixed in an array. Each receiver has a different focal point such that, between the shape of the reflector and the feed horn and position of each LNBF, the signals may appear to be the same geometry or surface pattern for each receiver. This results in each LNBF receiving a signal with the same antenna gain and/or signal level as the other LNBFs in the array. As a result, only one satellite antenna needs to be installed rather than multiple satellite antennas. The single satellite antenna also fulfills the requirement that each satellite service provider receive equal treatment by the satellite antenna.

Figure 1:
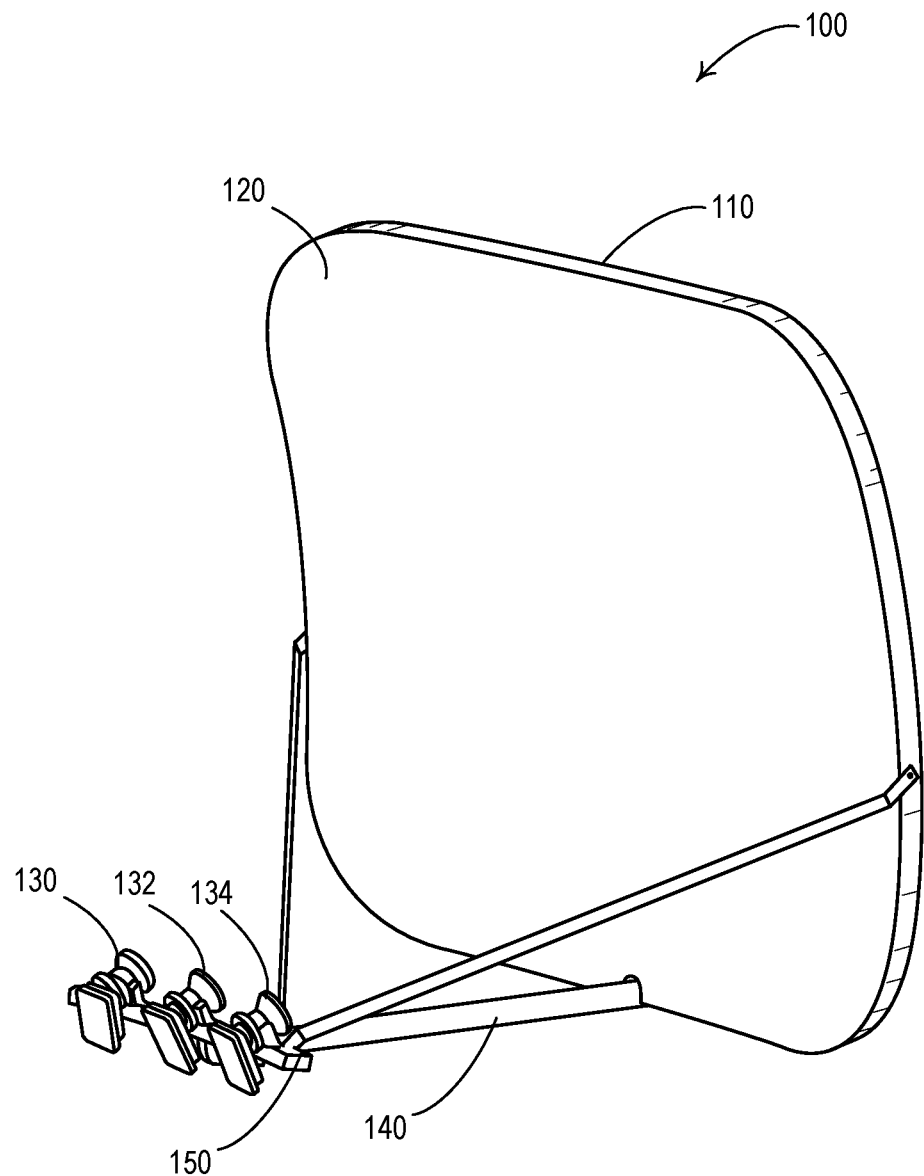
FIG. 1 is a perspective view of one embodiment of a satellite antenna, according to some embodiments of the present invention.
Figure 2:
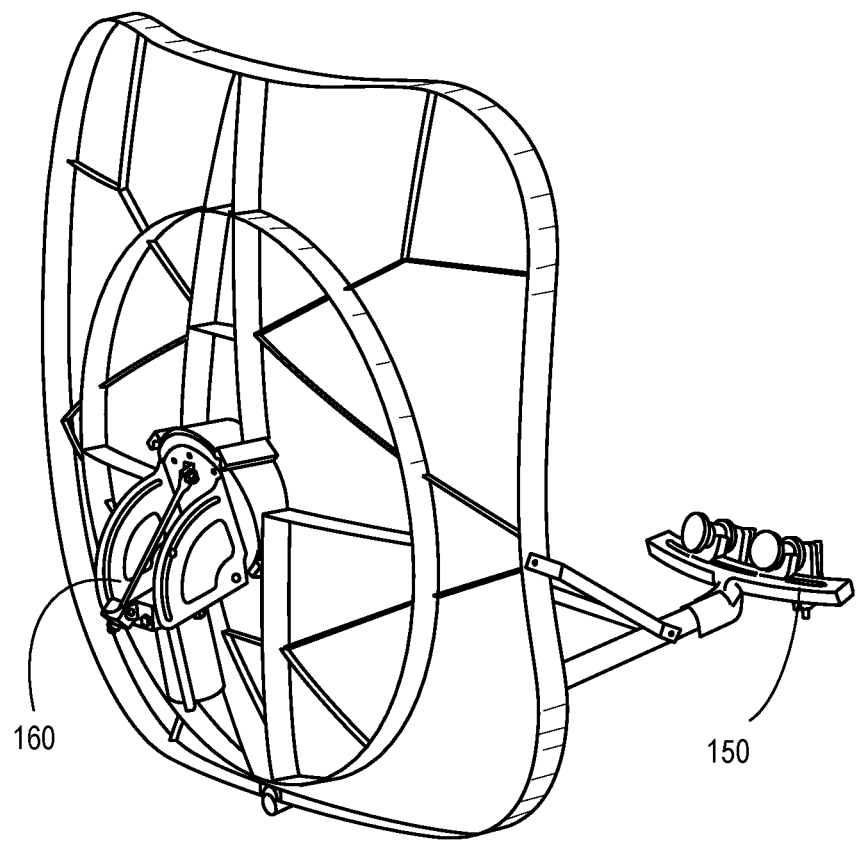
FIG. 2 is a rear perspective view of the embodiment of the satellite antenna.

FIG. 1 illustrates such a single satellite antenna 100 to be installed, according to some embodiments. The satellite antenna 100 includes a reflector antenna 110 that is designed and shaped to reflect radiated satellite signals from space off a first side 120 of the reflector antenna 110 towards an array of LNBFs 130, 132, 134, located at multiple respective focal points. The reflector antenna 110 may have a torus antenna reflector profile with what may be a total surface area of 1 meter on the first side 120. The LNBFs 130, 132, 134 may be bracketed with feed bracket 150 to a boom arm 140 that extends from an antenna mount that supports the reflector antenna 110. FIG. 2 is a back view of the satellite antenna 100 of FIG. 1. The antenna mount 160 can be seen in this figure. FIG. 2 also provides another view of the feed bracket 150.

The reflector antenna 110 may be molded or fashioned such that the first side 120 has different surfaces over different surface areas. In some embodiments, a first surface area of the first side exposes a first surface that is formed to reflect a first radiated signal towards a first focal point, such as at LNBF 130. The first side 120 also has a second surface area that is encompasses a second surface, where the second surface or second surface area is formed to reflect a second radiated signal towards a second focal point that is different than the first focal point, such as at LNBF 132. The second surface area may be inclusive of the first surface area. That is, even though the second surface is different than the first surface, the first surface area that encompasses the first surface may be considered to be included, wholly or in part, within the outer boundary of the second surface area. There may be a third surface area of the first side, encompassing a third surface, where the third surface is formed to reflect a third radiated signal towards a third focal point that is different than the first and second focal points, such as at LNBF 134. The third surface area may be inclusive of the first and second surface areas.

In some embodiments, the second surface area is exclusive of the first surface area and the third surface area of the first side may be exclusive of the first and second surface areas.

Figure 3:
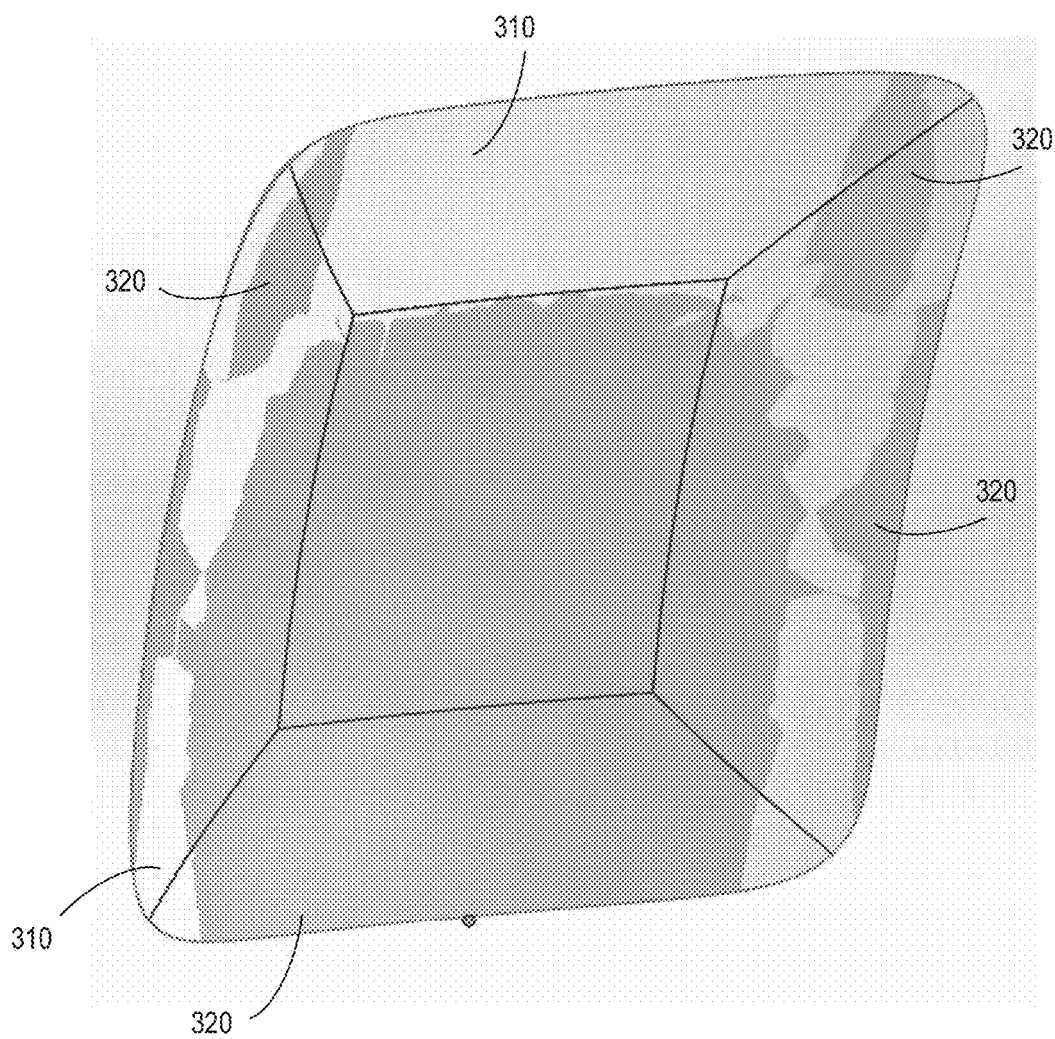
FIG. 3 is a diagram of shaped reflector surface areas on a first side of a reflector antenna, according to some embodiments.
Figure 4:
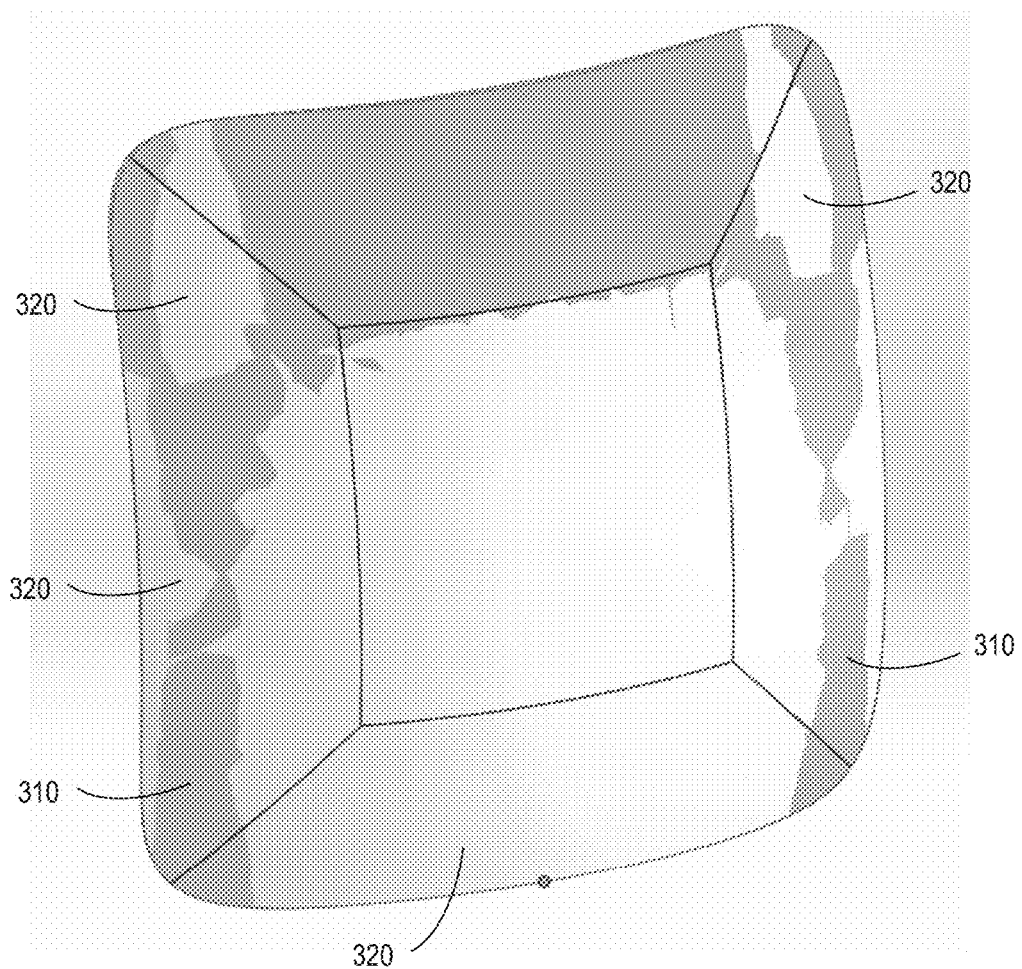
FIG. 4 is a diagram of the shaped surface areas as viewed from the opposite side of the reflector antenna.

FIG. 3 is a diagram, according to some embodiments, showing at least two surface areas 310 and 320 with differing surfaces, such that the first surface area 310 has a parabolic shape formed to reflect signals to a first focal point at the first LNBF 130. The second surface area 320 is shaped and revised from the parabolic shape to reflect signals to a second focal point at the second LNBF 132. FIG. 4 shows a back view of the reflector antenna 110 and the respective shaped surface areas 310, 320.

Figure 5:
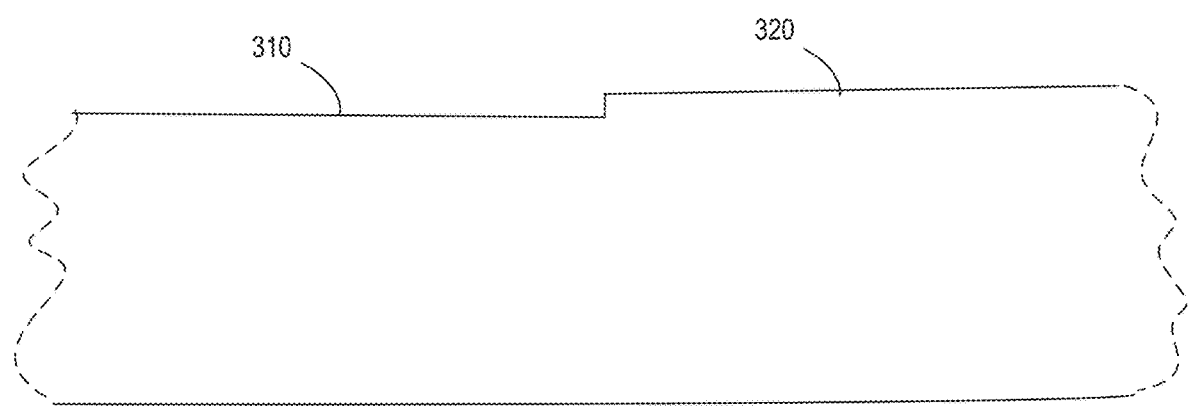
FIG. 5 is a diagram illustrating a cross-section slice of the reflector antenna, according to some embodiments.

In some embodiments, at least the first and second surfaces 310, 320 reflect signals towards respective first and second focal points due to how the exposed first and second surfaces of the respective first and second surface areas 310, 320 are formed. For instance, the shaped second surface of the second surface area 320 (or at least a portion) may be raised or recessed with respect to at least a portion of the first surface of the first surface area 310. This difference in height may be, for example, on the order of millimeters. FIG. 5 is a diagram illustrating a cross-section slice of the reflector antenna 110. In this figure, the second surface of the second surface area 320 is raised with respect to the first surface of the first surface area 310. As a result, the focal point of signals reflected off of the second surface is different than for signals reflected off of the first surface.

The first and second surfaces may be represented by a cloud of points having numeric values, forming what may be referred to as a numerical surface. The second surface, or the numeric values and/or positions of the points on the second surface, may be adjusted, to create what may be considered an artificial surface rather than a geometric surface that exists in nature. This adjustment may include changing the height or depth of the surface depending on the location on the first side 120 of the reflector antenna 110. In other words, the surface is no longer an analytical surface that follows a natural geometry. Rather, the reflector surface has been formed physically (e.g., molded) to adjust for the phase and magnitude of reflected signals, where the geometry changes as one traverses the surface. The change in the depth or height of the surface may be on the order of multiple millimeters.

In some cases, the second surface may be slightly angled in some fashion or otherwise formed to direct signals, like a lens, to a particular focal point.

As shown by FIG. 3, the first and second surface areas 310, 320 may have different shapes. One surface area may be larger than the other surface area. The shape, size and patterns of the surface areas may be so designed so that the geometry, antenna gain and/or bandwidth appears to be the same from the perspective of each of receivers 130 and 132. The borders between the surface areas 310, 320 may be uneven or irregular, perhaps jagged. The second surface area 320 may be centered, or occupy the center of the first side of the reflector, while the first surface area 310 substantially surrounds the second surface area 320. Portions of the second surface area 320 may be separated by the first surface area 310.

The focal points may all be equidistant from the first side 120 of the reflector antenna 110, forming an array of focal points. The reflector may be formed to reflect radiated signals at focal points spaced apart at 0, 5, 10 and 9 degrees.

Each of the first, second and third LNBFs may be configured to receive signals from a particular satellite. Each LNBF is placed in the array so that its respective view of the respective surface area on the reflector of each respective LNBF will see the same geometric shape. This will result in each of the LNBFs receiving a signal from a respective satellite, but in such a way where the antenna gain and/or beamwidth is equal or substantially equal for each satellite.

As a result, only one satellite antenna needs to be installed rather than multiple satellite antennas. The single satellite antenna also fulfills the requirement that each satellite service provider receive equal treatment by the satellite antenna.

Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A reflector antenna shaped to reflect radiated signals off a first side of the reflector antenna, the reflector antenna comprising:
 a first surface area of the first side encompassing a first surface, wherein the first surface is formed to reflect a first radiated signal towards a first focal point; and
 a second surface area of the first side, encompassing a second surface distinct from the first surface, wherein the second surface area is formed to reflect a second radiated signal towards a second focal point that is different than the first focal point, wherein the second surface area comprises at least two distinct portions separated by a portion of the first surface area, such that the at least two distinct portions do not contact one another.

2. The reflector antenna of claim 1, wherein the first and second surface areas and the respective first and second surfaces are formed to reflect the first and second radiated signals such that a first antenna gain and/or beamwidth of the reflected first radiated signal that would be received at the first focal point is about the same as a second antenna gain and/or beamwidth of the reflected second radiated signal that would be received at the second focal point.

3. The reflector antenna of claim 1, wherein at least a portion of the second surface is raised or recessed with respect to the first surface so as to form a distinct boundary between the second surface and the first surface having a height of multiple millimeters.

4. The reflector antenna of claim 1, wherein the second surface area is a different area shape than the first surface area.

5. The reflector antenna of claim 1, wherein the second surface or a portion of the second surface has a different geometry than the first surface or a portion of the first surface.

6. The reflector antenna of claim 1, wherein the second surface is formed to reflect signals in a different direction with respect to the first side than the first surface.

7. The reflector antenna of claim 1, wherein the second surface area is larger than the first surface area.

8. The reflector antenna of claim 1, wherein the second surface area or a portion of the second surface area covers the center of the first side and the first surface area does not cover the center of the first side.

9. The reflector antenna of claim 1, wherein the second surface area comprises a portion that (a) consists of a majority of the second surface area, (b) is not in contact with one or more other portions of the second surface area, and (c) is substantially surrounded by the first surface area.

10. The reflector antenna of claim 1, wherein the second focal point is about the same distance from the first side of the reflector as the first focal point, and wherein the second focal point is adjacent to the first focal point so as to form an array of focal points.

11. The reflector antenna of claim 1, wherein the reflector antenna is formed to reflect radiated signals at focal points spaced apart at 0, 5, 9 and 10 degrees.

12. The reflector antenna of claim 1, wherein the reflector antenna has a torus antenna reflector profile.

13. The reflector antenna of claim 1, wherein the first side of the reflector antenna has a total surface area of about 1 square meter.

14. The reflector antenna of claim 1, wherein the second surface area is inclusive of the first surface area.

15. The reflector antenna of claim 1, further comprising a third surface area of the first side, encompassing a third surface, wherein the third surface is formed to reflect a third radiated signal towards a third focal point that is different than the first and second focal points, wherein the first, second and third surface areas and the respective first, second and third surfaces are formed to reflect the first, second and third radiated signals such that a first antenna gain and/or beamwidth of the reflected first radiated signal that would be received at the first focal point is about the same as a second antenna gain or beamwidth of the reflected second radiated signal that would be received at the second focal point and a third antenna gain and/or beamwidth of the reflected third radiated signal that would be received at the third focal point.

* * * * *